(12) United States Patent
Korwin

(10) Patent No.: US 6,354,174 B1
(45) Date of Patent: Mar. 12, 2002

(54) DEVICE FOR REMOVING A TARP

(76) Inventor: Roger Korwin, 41 High St., Cassadaga, NY (US) 14718

( * ) Notice: Subject to any disclaimer, the term of this patent is extended or adjusted under 35 U.S.C. 154(b) by 0 days.

(21) Appl. No.: 09/386,611

(22) Filed: Aug. 31, 1999

(51) Int. Cl.[7] .................................................. B67B 7/16
(52) U.S. Cl. ............................................. 81/3.55; 7/169
(58) Field of Search ................................. 81/3.55, 3.09, 81/3.57; 7/123, 169, 170; 29/243.56, 267, 278

(56) References Cited

U.S. PATENT DOCUMENTS

| | | |
|---|---|---|
| 745,984 A | 12/1903 | Alkire |
| D159,533 S * | 8/1950 | Przybyla ...................... D44/29 |
| 2,640,382 A | 6/1953 | Grossman |
| 2,687,540 A | 8/1954 | Noll |
| 3,813,081 A | 5/1974 | Alger |
| 4,096,618 A * | 6/1978 | Perline et al. ................ 29/278 |
| 4,589,153 A | 5/1986 | Paquette |
| 4,694,550 A * | 9/1987 | Grove .......................... 29/267 |
| 5,018,409 A * | 5/1991 | Bittel .......................... 81/3.55 |
| 5,069,090 A * | 12/1991 | Clark .......................... 81/3.09 |
| 5,079,791 A | 1/1992 | Grech |
| 5,150,505 A * | 9/1992 | Drabek ........................ 29/278 |
| 5,212,860 A * | 5/1993 | Lakey ......................... 29/270 |
| 5,276,948 A | 1/1994 | Steadman |
| 5,457,834 A | 10/1995 | Allen, Sr. |

* cited by examiner

Primary Examiner—Timothy V. Eley
Assistant Examiner—Dung Van Nguyen
(74) Attorney, Agent, or Firm—The Bilicki Law Firm, P.C.

(57) ABSTRACT

A tool for removing either clasped or snapped fasteners from tarps and canvases. The tool has at one end a hook which can be inserted into an opening between the clip and the rail on a clasped fastener. The tool is moved along the rail and twisted upwards resulting in disengagement of the clasped fastener. The other end of the tool has a claw which is pushed around the fastener cap on a snapped fastener. Upward force can be applied to the button, if necessary, to dislocate it from the fastener base. The tool is provided with a hole so that it can be carried on key rings or key chains.

11 Claims, 2 Drawing Sheets

DEVICE FOR REMOVING A TARP

TECHNICAL FIELD

This invention relates generally to tools and devices for opening fasteners. The invention relates more particularly to tools for opening clasped and snapped fasteners.

BACKGROUND ART

Clasped fasteners generally comprise a plastic clip with two outward facing male projections. The plastic clip is fixed to a material or surface by rivets, screws, or other holding devices. A rail consisting primarily of an elongated channel with two inward facing female projections mates with the plastic clip. The rail is fixably mounted on a surface to be covered. The male projections are forced into the female projections and are held in place by a lip portion of the female projections. The plastic clip can be removed from the rail by simply applying enough force in the opposite direction to pop the male projections from the female projections.

Snap fasteners comprise a base which is fixed to a material or surface by a rivet, screw, or other holding device. A cap can be removably snapped onto the base. The cap has an expandable slip ring which holds the cap fast to the base.

Clasped fasteners and snap fasteners are used for covering the open portions of boats, truck beds, trailers, and the like with a heavy duty fabric weatherproof material such as canvas or tarpaulin.

The coverings are usually removed by pulling on the fabric at the snap or plastic clip to release the cap or plastic clip from the base. Tugging at the material to open the clasped or snapped fasteners is sometimes quite difficult and can result in the breakage of fingernails. After repeated openings, the tugging also results in damage to the fabric or material to which the clasped or snapped fasteners have been attached.

U.S. Pat. No. 5,457,834 (Allen, Sr.) discloses a tool for removing snapped fasteners. The tool has a recess on one end which has two prongs on either side. These prongs are wedge shaped and curved. The wedge shape allows for the tool to be slid between the snap fastener base and the snap fastener cap. The curved shape of the prongs provides an upward pressure on the cap of the snap fastener which assists in separating the cap from the base of the snap fastener. Additional pressure is applied on the opposite end of the tool resulting in a pivoting action which separates the cap from the base.

Other types of prying devices are disclosed in U.S. Pat. No. 5,079,791 (Grech) for removing a snap fastener from and reattaching a snap fastener to a base; and in U.S. Pat. No. 2,687,540 (Noll) for extracting thumbtacks.

Although these devices teach how to unhook snapped fasteners, they do not disclose how a clasped fastener can be quickly and easily removed by the use of a tool. There is a need for a tool that allows for removal of tarps and canvas that are connected using either snaps or clasps. There is also a further need for such a tool that is small, light, portable, simple, and easy to manufacture.

OBJECTS OF THE INVENTION

Accordingly, it is the general object of the instant invention to provide a snapped fastener opener in combination with a clasped fastener opener so that both clasped and snapped fasteners can be removed with the use of a single tool.

It is a further object of the instant invention to provide a clasped fastener opener which is capable of removing a clip from a rail.

It is yet a further object of the instant invention to provide a clasped and snapped fastener opener which overcomes the shortcomings of and improves upon the existing devices.

It is still yet a further object of the instant invention to provide a clasped and snapped fastener opener which is portable, light, ergonomic, and which can be attached to key holders.

It is still another object of the instant invention to provide a clasped and snapped fastener remover which is inexpensive and easy to manufacture.

DISCLOSURE OF THE INVENTION

These and other objects of the instant invention are achieved by providing a tool which is elongated in shape and has a member for removing clasped fasteners on one end, and a member for removing snapped fasteners on an opposite end.

The member for removing clasped fasteners consists essentially of a hook. This hook is placed into an opening which is defined by the clip and the rail when the former is fitted into the later. A twisting action is applied to the tool as it is moved along the rail. This results in the clip becoming disengaged from the rail and therefore leads to the removal of the tarp or canvas from the structure.

The member for removing snapped fasteners consists of a claw. The claw is pushed around a fastener cap and downward force is applied to the opposite end of the tool. The prongs of the claw contact the fastener cap and dislocate it from the fastener base.

This invention is very valuable to owners and people who work with truck and boat tarps because it incorporates a snapped and clasped tarp remover into one tool. A hole is provided in the tool so that the tool may be attached to a key chain or other holding device.

BRIEF DESCRIPTION OF THE DRAWINGS

Other objects and many of the intended advantages of this invention will be readily appreciated when the same becomes better understood by reference to the following detailed description, when considered in connection with the accompanying drawings wherein.

BEST MODE FOR CARRYING OUT THE INVENTION

Figure 1:
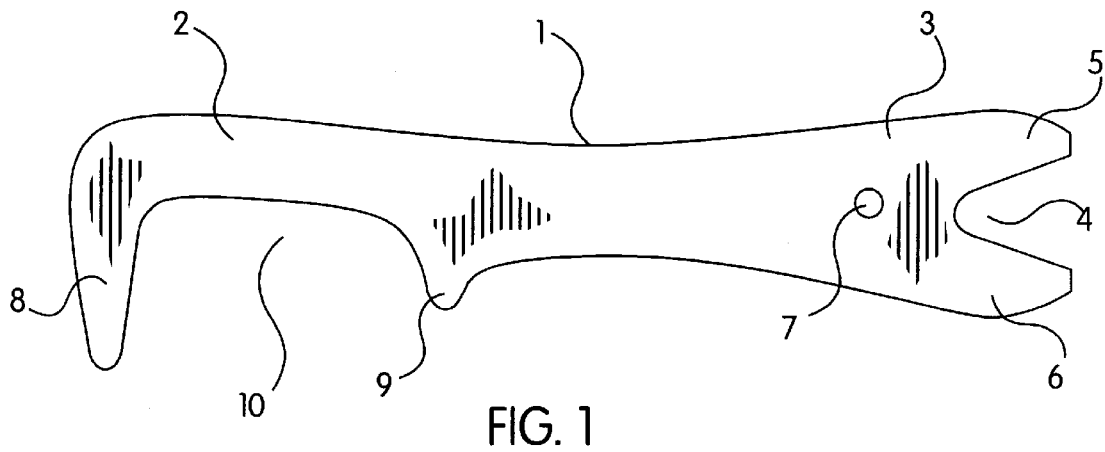
FIG. 1 is a front view of a device for removing a tarp from a truck bed according to the invention.
Figure 2:
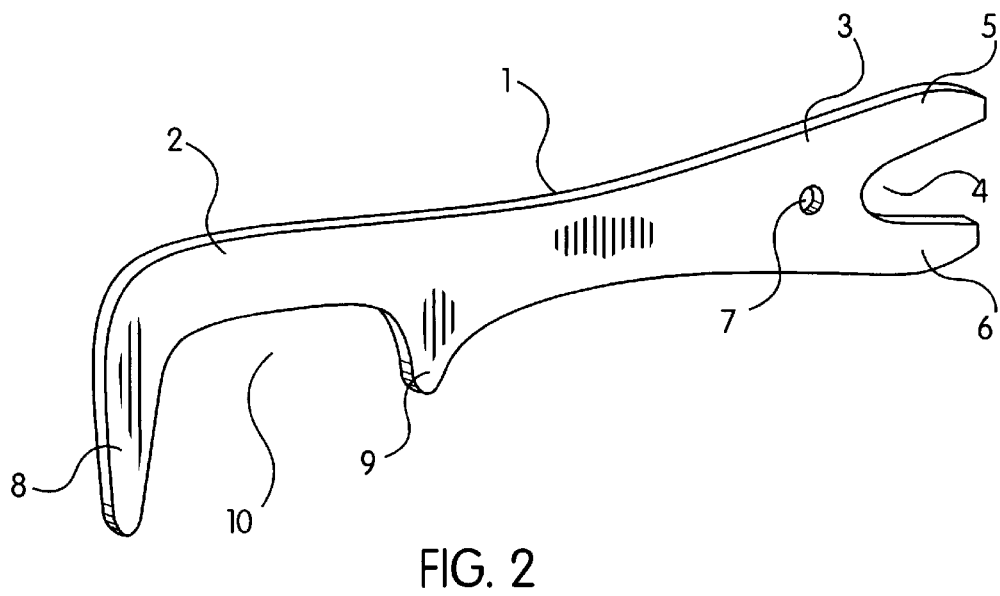
FIG. 2 is an isometric view of a device for removing a tarp from a truck bed according to the invention.
Figure 3:
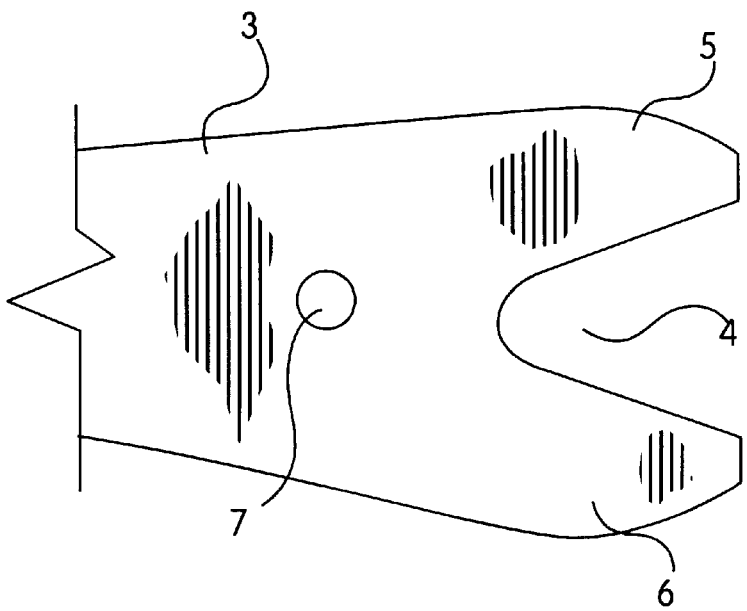
FIG. 3 is an enlarged fragmentary front view showing the second end of the device.
Figure 4:
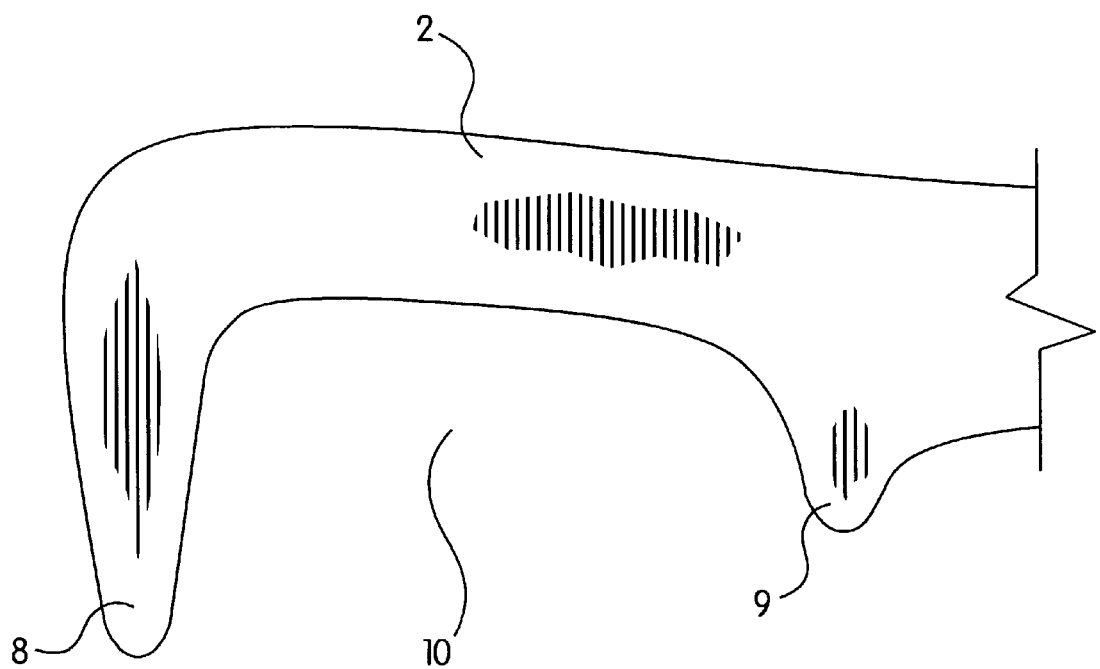
FIG. 4 is an enlarged fragmentary front view showing the first end of the device.

Referring now to the drawings, FIGS. 1 and 2 show a device for removing a tarp from a truck bed. The device for removing a tarp from a truck bed has a central section 1 located between a first end 2 and a second end 3. The central section is the handle for the device and is 0.75 of an inch in width. The total length of the device is 7.3 inches.

The first end 2 has a hook 8 and a projection 9. The hook 8 is located on the extreme end of the device, and extends 1.25 inches. The projection 9 is located 2.3 of an inch from the hook 8 and extends in the same direction, being substantially parallel with hook 8. Hook 8 and projection 9 define a first recess 10 within first end 2.

The second end 3 has a first prong 5 and a second prong 6 located on the extreme end of the device. First prong 5 and second prong 6 extend 1 inch in approximately the same direction, and they define a recess 4. Recess 4 is 0.65 of an inch at its widest point, which is on the extreme end of the device. The first prong 5, second prong 6, and recess 4 define a claw.

The second end 3 also has a hole 7 located 0.5 of an inch from the junction of first prong and second prong 6. Hole 7 is 0.25 of an inch in diameter. Hole 7 is provided to allow greater ease in attaching the device to key holders such as key rings and the like.

Certain pickup trucks are equipped with rails and clasps. The clasp is secured to the perimeter of the tarp. The rail is disposed along the perimeter of the truck's bed, at the top of the two sidewalls and tailgate. In order to secure the tarp to the truck, the clasp is fitted into the rail. The first end 2 of the device fits into the opening defined by the clasp and rail when the former is fitted into the latter. The device is slightly lifted to allow the operator to disengage the clasps from the rail and thereby remove the tarp from the truck. The first end 2 provides quick and painless removal of the tarp, particularly in cold weather.

The second end 3 of the device is specifically designed to remove snapped tarps. The recess 4 is sized to fit around button snaps commonly found on truck beds. As the device is lifted slightly, the snap is easily disengaged allowing for the removal of the tarp.

It will be appreciated that various modifications and changes may be made to the above described preferred embodiment of a device for removing a tarp without departing from the scope of the following claims.

What is claimed is:

1. A tool for disengaging a tarp from a truck bed comprising:

(a) an elongated handle body having first and second opposite ends;

(b) a hook tip connected to said first end consisting of two straight projections parallel to each other, said two straight projections aligned along the long axis of said elongated handle body wherein said two projections are spaced apart to pry said tarp from a plurality of clasps on said truck bed; and;

(c) a claw connected to said second end of said handle consisting of two prongs spaced apart so that the inside edges of said prongs define an aperture sufficient to include the external diameter of a button snap on said tarp.

2. The tool of claim 1 wherein said member is comprised of polyvinyl chloride.

3. The tool of claim 1 wherein said member is comprised of steel.

4. The tool of claim 1 wherein said member is comprised of aluminum.

5. The tool of claim 1 wherein said member is 9/32 of an inch in thickness.

6. The tool of claim 1 wherein juncture of said claw is 4.5 inches from center of said projection.

7. The tool of claim 1 wherein said claw is 1 inch in length and said claw having maximum separation of 0.65 of an inch.

8. The tool of claim 1 wherein said hook is 1.875 inches in length and center of said hook and center of said projection is located 2.3 inches apart.

9. The tool of claim 1 wherein said member having a hole located next to the juncture of said claw.

10. The tool of claim 1 wherein the overall length of said tool is 7.3 inches.

11. The tool of claim 1 wherein said member having a hole located on an end of said member opposite from said hook.

\* \* \* \* \*